(12) United States Patent
Cole

(10) Patent No.: US 6,519,280 B1
(45) Date of Patent: Feb. 11, 2003

(54) METHOD AND APPARATUS FOR INSERTING IDLE SYMBOLS

(75) Inventor: Terry L. Cole, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/260,251

(22) Filed: Mar. 2, 1999

(51) Int. Cl.⁷ .............................. H04B 1/38; H04L 5/16
(52) U.S. Cl. ...................................... 375/222; 370/459
(58) Field of Search ................................ 375/219, 222, 375/223, 368; 370/514, 459, 460; 379/334, 337

(56) References Cited

U.S. PATENT DOCUMENTS 6,201,830 B1 * 3/2001 Chellali et al. ............. 375/222

FOREIGN PATENT DOCUMENTS

| EP | 0833269 | 9/1998 |
| WO | WO 98/51067 | 11/1998 |
| WO | WO 99/52219 | 10/1999 |

* cited by examiner

Primary Examiner—Phuong Phu
(74) Attorney, Agent, or Firm—Williams, Morgan & Amerson, P.C.

(57) ABSTRACT

A communication device includes a transmitter and a first idle detector. The transmitter is adapted to transmit digital data. The digital data includes user data. The transmitter includes a first idle symbol buffer for storing a first idle symbol. The first idle detector is adapted to detect an absence of user data. The transmitter is adapted to transmit the first idle symbol in response to detecting the absence of user data. A method for transmitting data includes defining a first idle symbol. The user data is stored in a buffer. The user data is modulated to generate a user symbol. An absence of user data in the buffer is detected, and the first idle symbol is transmitted in response to detecting the absence of user data.

13 Claims, 5 Drawing Sheets

METHOD AND APPARATUS FOR INSERTING IDLE SYMBOLS

BACKGROUND OF THE INVENTION

1. Field of the Invention

This invention relates generally to communication systems, and, more particularly, to a transceiver with an adjustable coding gain to control the complexity of the transceiver processing algorithm.

2. Description of the Related Art

In communications systems, particularly telephony, it is common practice to transmit signals between a subscriber station and a central switching office via a two-wire bi-directional communication channel. The Plain Old Telephone System (POTS), designed primarily for voice communication, provides an inadequate data transmission rate for many modem applications. To meet the demand for high-speed communications, designers have sought innovative and cost-effective solutions that take advantage of the existing network infrastructure. Several technological advancements have been proposed in the telecommunications industry that make use of the existing network of telephone wires. One of these technologies is the xDSL technology. DSL technology uses the existing network of telephone lines for broadband communications. An ordinary twisted pair equipped with DSL interfaces can transmit video, television, and high-speed data.

DSL technologies leave the POTS service undisturbed. Traditional analog voice band interfaces use the same frequency band, 0–4 Kilohertz (kHz), as telephone service, thereby preventing concurrent voice and data use. A DSL interface, on the other hand, operates at frequencies above the voice channels from 100 kHz to 1.1 Megahertz (MHz). Thus, a single DSL line is capable of offering simultaneous channels for voice and data.

DSL systems use digital signal processing (DSP) to increase throughput and signal quality through common copper telephone wire. Certain DSL systems provide a downstream data transfer rate from the DSL Point-of-Presence (POP) to the subscriber location at speeds of about 1.5 Megabits per second (MBPS). The transfer rate of 1.5 MBPS, for instance, is fifty times faster than a conventional 28.8 kilobits per second (KBPS) transfer rate.

One popular version of the DSL technology is Asymmetrical Digital Subscriber Line (ADSL) technology. The ADSL standard is described in ANSI T1.413 Issue 2, the most recent version of which, as of the filing date of the present application, is incorporated herein by reference in its entirety.

ADSL modems use two competing modulation schemes: discrete multi-tone (DMT) and carrierless amplitude/phase modulation (CAP). DMT is the standard adopted by the American National Standards Institute. The technology employed by DMT ADSL modems is termed discrete multi-tone. The standard defines 256 discrete tones. Each tone represents a carrier signal that can be modulated with a digital signal for transmitting data. The specific frequency for a given tone is 4.3125 kHz times the tone number. Tones 1–7 are reserved for voice band and guard band (i.e., tone 1 is the voice band and tones 2–7 are guard bands). Data is not transmitted near the voice band so that voice and data can be transmitted simultaneously on a single line. The guard band helps isolate the voice band from the ADSL data bands. Typically, a splitter may be used to isolate any voice band signal from the data tones. Tones 8–32 are used to transmit data upstream (i.e., from the user), and tones 33–256 are used to transmit data downstream (i.e., to the user). Alternatively, all the data tones 8–256 may be used for downstream data, and upstream data present on tones 8–32 would be detected using echo cancellation. Because more tones are used for downstream communication than for upstream communication, the transfer is said to be asymmetric.

Through a training procedure, the modems on both sides of the connection sense and analyze which tones are less affected by impairments in the telephone line. Each tone that is accepted is used to carry information. Accordingly, the maximum capacity is set by the quality of the telephone connection. The maximum data rate defined by the ADSL specification, assuming all tones are used, is about 8 MBPS downstream and about 640 KBPS upstream. In a typical ADSL system, a central office (CO) modem communicates with a customer premise (CP) modem. The CP modem is typically installed in a home or office.

Techniques have been developed to increase the transfer rate and/or accuracy of the modem data exchange. To support higher data transmission rates, these modems employ powerful, but computationally taxing, algorithms, such as Trellis Coded Modulation (TCM). Generally, during an exchange between modems, the bandwidth of the connection is greater than the amount of user data being exchanged. In such cases where a user is not fully-utilizing the allocated bandwidth, idle cells are inserted to bring the overall data rate up to the capacity of the connection. Idle cells are separated at the receiving end, but they are still modulated by the transmitter and demodulated by the receiver, and thus, they require the same amount of processing as user data. This leads to unnecessary power and processing resource usage due the processing required to support the idle cells. This excess usage is especially inefficient in an application where a single processing resource is used to support a pool of connections (i.e., a central office modem may support multiple connections). The modulating and demodulating of idle cells represents a significant processing and power drain.

Referring to FIG. 1, a block diagram of a prior art modem 10 employing idle data insertion is shown. The modem 10 includes a transmitter 12 and a receiver 14. The transmitter 12 includes a protocol processing unit 16 that receives user data from the computer or communications system employing the modem 10. The protocol processing unit 16 performs standard functions, such as formatting, compressing, serializing, adding control information in accordance with the particular modem protocol being implemented, etc. The protocol processing unit 16 transforms the user data packets to protocol data units, sometimes referred to as frames, depending on the particular protocol.

An idle detector 18 monitors the stream of user data and determines when there is no data to be sent (i.e., user data buffer is empty). The idle detector 18, in response to the status of the user data, selects between the encoded user data from the protocol processing unit 16 and idle data by controlling a multiplexer 20. The specific makeup of the idle data is protocol dependent. Some protocols generate idle frames that include control information indicating that a frame is idle. Other protocols generate idle cells, such as repeating interfill flags.

The output of the multiplexer 20 (i.e., user data or idle data) is received by a modulator 22. The modulator 22 performs protocol specific functions, such as cyclic redundancy checking (CRC), scrambling, forward error correction, and interleaving. The modulator 22 also performs tone ordering, constellation encoding, gain scaling, and an inverse discrete Fourier transform (IDFT) function to provide time domain transmit waveform samples of a carrier or carriers modulated with the data. The set of time domain transmit waveform samples corresponding to a frame of data is referred to as a symbol.

A transmitter analog front end (TX AFE) 24 receives the digital symbol and generates an analog time domain transmit waveform for transmission on a phone line 26 (or other like external connection) coupled to the modem 10. The functions performed by the modulator 22 and TX AFE 24 are identical regardless of whether the transmit waveform represents user data or idle data.

The receiver 14 includes a receiver analog front end (RX AFE) 28 coupled to the phone line 26 for receiving data from an interfacing modem (not shown) communicating with the modem 10. The RX AFE 28 receives an analog waveform and converts it to a series of digital waveform samples. The received waveform samples are processed by a demodulator 30, which transforms the time domain waveform data to frequency domain data by implementing a discrete Fourier transform (DFT). The demodulator 32 performs echo cancellation if required to separate the received waveform from the transmit waveform, a slicing function to determine constellation points from the constellation encoded data, a demapping function to map the identified constellation point back to bits, and a decoding function (e.g., Viterbi decoding if trellis constellation coding is employed). The demodulator 30 also performs tone deordering to reassemble the bytes that were divided among the available tones, forward error correction, CRC checking, and descrambling functions to reconstruct the protocol data units corresponding to the received data.

The reconstructed data is provided to a protocol processing unit 32 to extract the received data from the other control data embedded in the protocol data unit. An idle detector 34 analyzes the received protocol data units and identifies those protocol data units corresponding to idle data. The idle detector 34 controls a multiplexer 36 that selects between the received data generated by the protocol processing unit and an indication of "No Data." The output of the multiplexer 36 is provided to the computer or communications system that employs the modem 10.

Similar to the transmitter 12, the demodulator 30 performs all of its demodulating and decoding functions prior to identifying idle data. Accordingly, In both the transmitter 12 and the receiver 14, idle data represents a processing overhead that is not applied to the communication of useful data. Because a communications channel is seldom used at its maximum throughput capacity, the processing overhead attributable to idle data represents a significant inefficiency for the modem 10 and the processing resources required to support the modem functionality.

The present invention is directed to overcoming, or at least reducing the effects of, one or more of the problems set forth above.

SUMMARY OF THE INVENTION

One aspect of the present invention is seen in a communication device including a transmitter and a first idle detector. The transmitter is adapted to transmit digital data. The digital data includes user data. The transmitter includes a first idle symbol buffer for storing a first idle symbol. The first idle detector is adapted to detect an absence of user data. The transmitter is adapted to transmit the first idle symbol in response to detecting the absence of user data.

Another aspect of the present invention is seen in a method for transmitting data. The method includes defining a first idle symbol. The user data is stored in a buffer. The user data is modulated to generate a user symbol. An absence of user data in the buffer is detected, and the first idle symbol is transmitted in response to detecting the absence of user data.

BRIEF DESCRIPTION OF THE DRAWINGS

The invention may be understood by reference to the following description taken in conjunction with the accompanying drawings, in which like reference numerals identify like elements, and in which.

Figure 1:
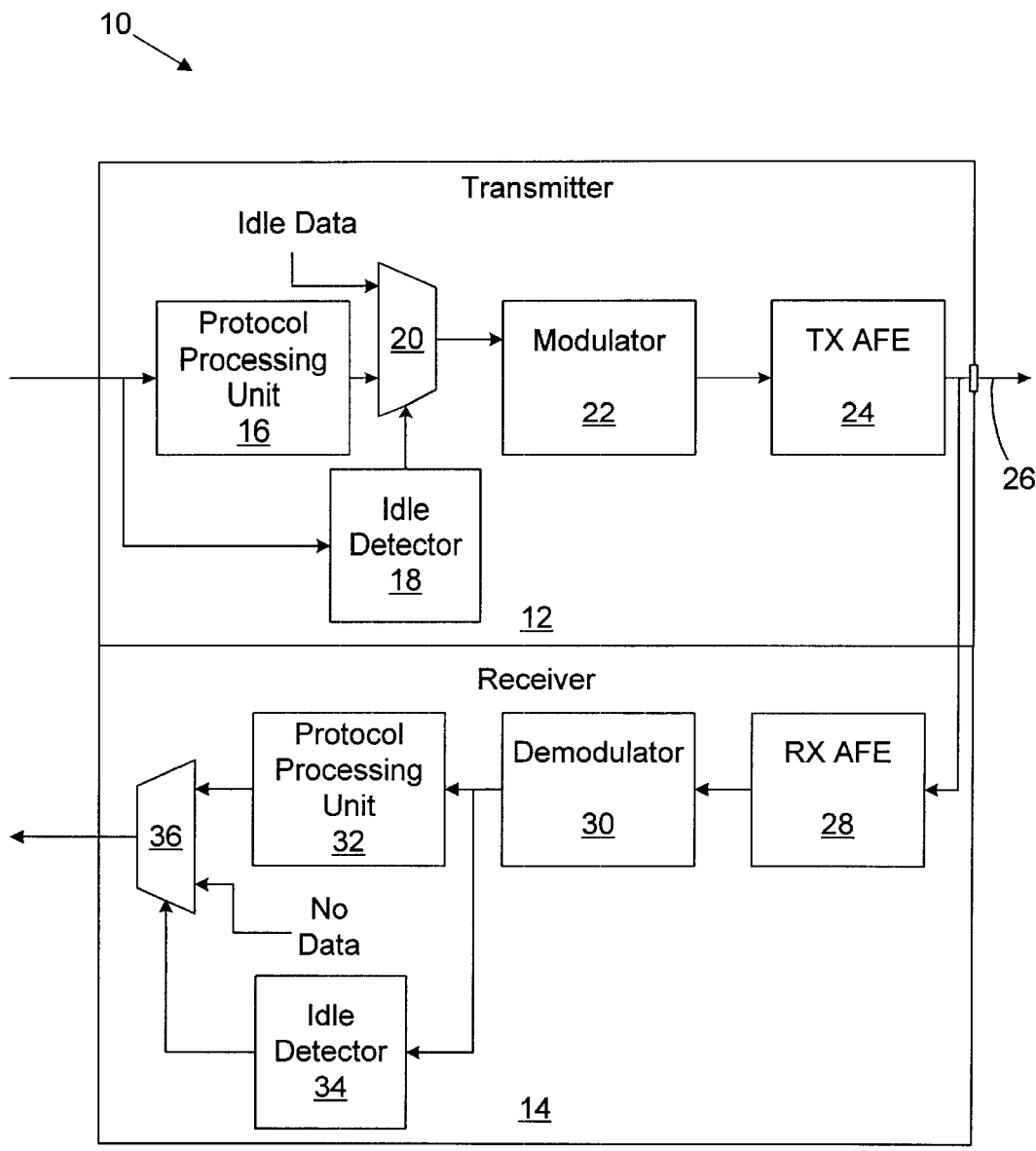
FIG. 1 is a block diagram of a prior art modem employing idle data insertion.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
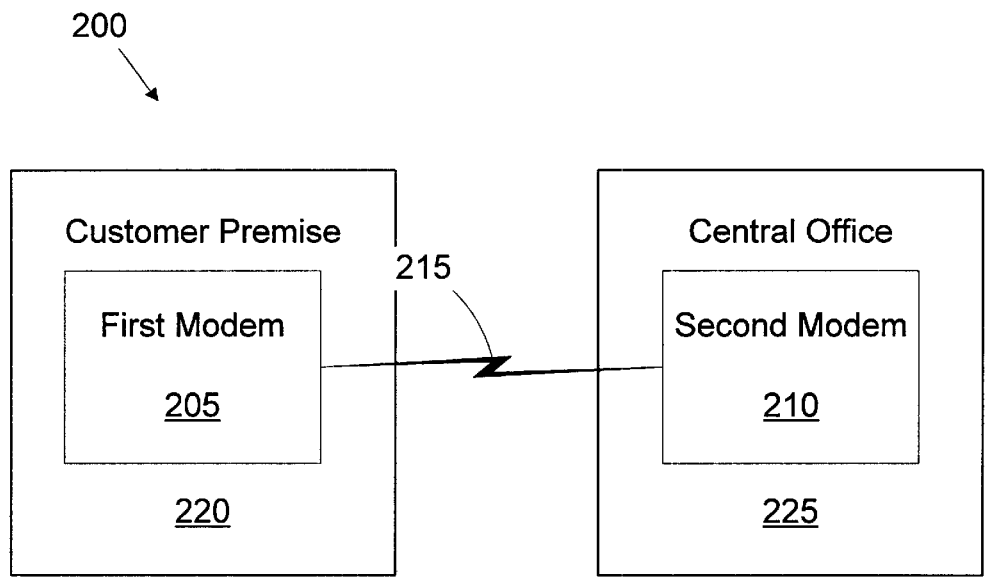
FIG. 2 is a block diagram of a communications system in accordance with the present invention.

Referring to FIG. 2, a block diagram of a communications system 200 in accordance with the present invention is provided. The communications system 200 includes a first modem 205 coupled to a second modem 210 through a connection 215. In the illustrated embodiment, the first modem 205 is located at a customer premise 220, and the second modem 210 is part of a central office 225. The connection 215 is a conventional twisted pair connection, as is common in present-day telephone networks. However, other connection types (e.g., wireless, cellular, etc.) are contemplated, depending on the specific implementation. Also, it is contemplated that the second modem 210 may not be part of the central office 225, but rather the second modem 210 may be installed in a second customer premise (not shown). For purposes of illustration, the modems 205, 210 are described as they might be implemented under the ADSL standard. It is contemplated that the techniques described herein may be applied to other communication protocols, depending on the specific implementation.

In the illustrated embodiment, the second modem 210 acts as a gateway to a larger communications network (not shown), such as a local or wide area network, or the Internet. Typically, the first modem 205 establishes a connection to the communications network (not shown) through the second modem 210. During the process of establishing the connection, the first and second modems 205 and 210 complete a training process whereby the throughput available for communication between the modems 205, 210 is determined.

Although the present invention is described as it may be implemented in a modem 205, 210, it is contemplated that, in light of this disclosure, the invention may be applied to any type of transceiver, including, but not limited to, a modem or some other wired or wireless communication device.

Figure 3:
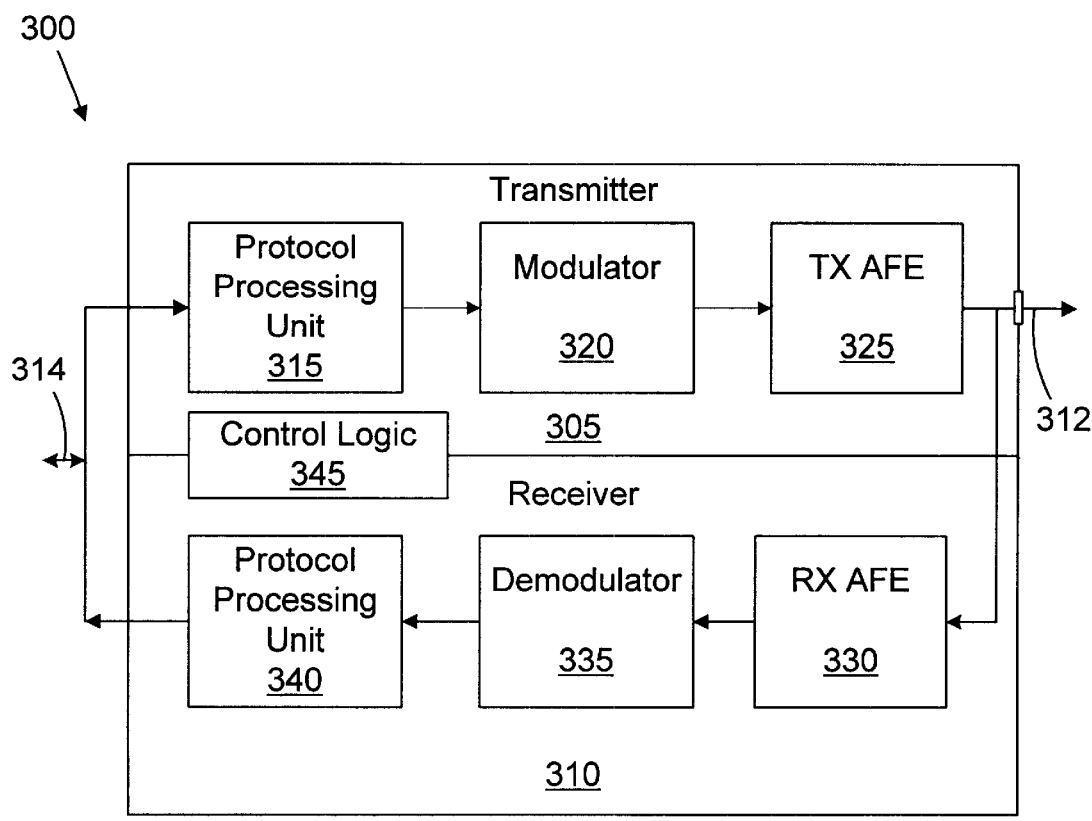
FIG. 3 is a simplified block diagram of a modem in accordance with the present invention.

Referring to FIG. 3, a simplified block diagram of a modem 300 is provided. The modem 300 may be the first modem 205 or the second modem 210. For clarity and ease of illustration, not all functional blocks are illustrated in detail, because these items are known to those of ordinary skill in the art, and are further defined in well-known modem standards.

The modem 300 includes a transmitter 305 and a receiver 310. The transmitter 305 and receiver 310 interface with a communications channel 312, such as a telephone line, for communicating with an interfacing modem (not shown), and a communications port 314, such as a serial port, for transferring data between the modem 300 and a computer (not shown) or communications system (not shown) that employs the modem 300.

The transmitter 305 includes a protocol processing unit 315, a modulator 320, and a transmit analog front end (TX AFE) 325. The protocol processing unit 315 and the modulator 320 are standard in that they perform protocol dependent functions similar to those described above in reference to FIG. 1. The transmit analog front end 325 detects an idle condition and inserts an idle symbol characteristic of the idle condition. An idle symbol corresponds to time domain waveform data, and accordingly, the modulator 320 is not required to process idle data. The construct of the transmit analog front end 325 is discussed in greater detail below in reference to FIG. 4.

The receiver 310 includes a receive analog front end (RX AFE) 330, a demodulator 335, and a protocol processing unit 340. Again, the demodulator 335 and the protocol processing unit 340 are standard in that they perform protocol dependent functions similar to those described above in reference to FIG. 1. The receive analog front end 330 detects the receipt of idle data and bypasses the demodulator 335 to obviate the need for processing by the demodulator 335. The construct of the receive analog front end 330 is discussed in greater detail below in reference to FIG. 5.

Control logic 345 interfaces with the transmitter 305 and the receiver 310 to perform functions such as establishing a connection and training the connection. The interaction of the control logic 345 with the transmitter 305 and the receiver 310 is described in greater detail below.

Figure 4:
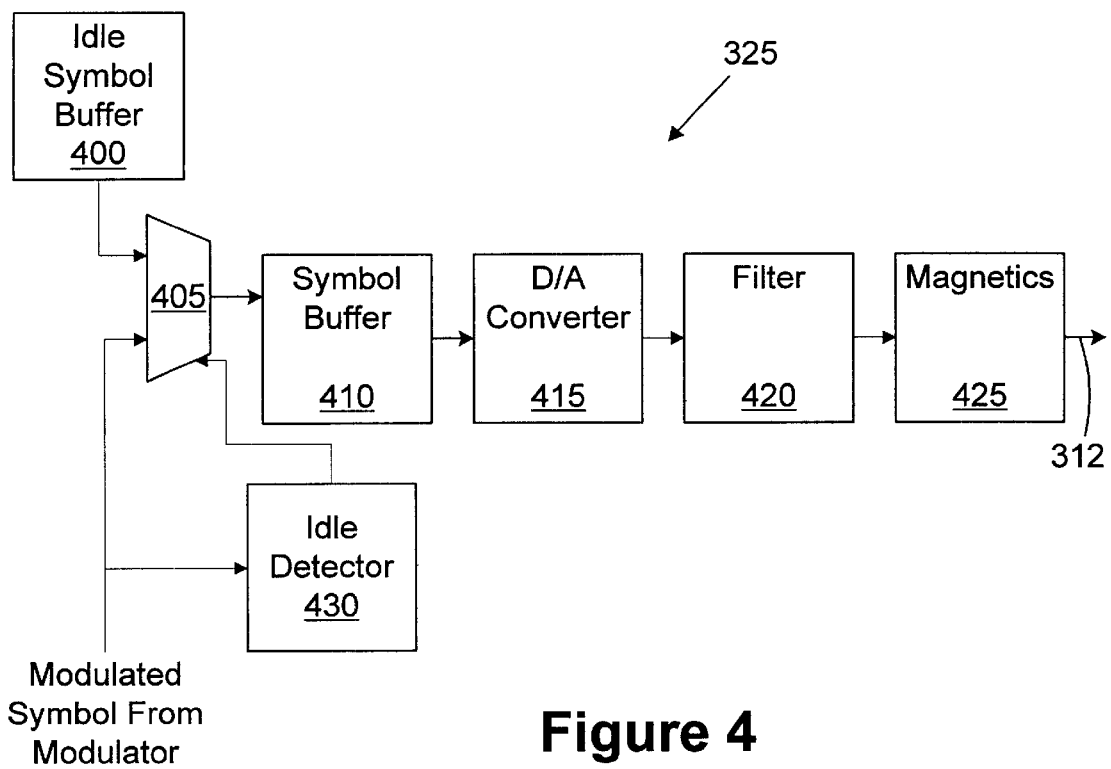
FIG. 4 illustrates a simplified block diagram of a transmitter analog front end of the modem of FIG. 3.

Tuning now to FIG. 4, a simplified block diagram of the transmit analog front end 325 is provided. The transmit analog front end 325 includes an idle symbol buffer 400 for storing a predetermined idle symbol waveform. Exemplary methods for generating the idle symbol waveform are discussed below. The idle symbol buffer 400 is connected to a multiplexer 405 that also receives the symbol output from the modulator 320 (shown FIG. 3). The multiplexer 405 is connected to a symbol buffer 410 for storing waveform samples. The contents of the symbol buffer 410 are provided to a digital-to-analog (D/A) converter 415, which generates the analog transmit waveform from the symbol samples.

The output of the D/A converter 415 passes through a standard (i.e., known in the art) filter 420 for removing high frequency reflections of the desired spectrum created by the digital sampled data stream. Also, the filter 420 may provide other frequency or time domain conditioning functions known in the art. The output of the filter 420 passes to a magnetics block 425. The magnetics block 425 provides an interface with the communications channel 312 using standard POTS (plain old telephone system) signaling techniques (e.g., two-wire to four-wire conversion, on and off-hook impedances, ring detection, FCC regulated electronics, etc.).

An idle detector 430 monitors the output of the modulator 320 (shown in FIG. 3) to determine if the modulator stops supplying modulated symbols associated with user data. Based on the determination of an idle condition (i.e., no samples, no interrupt), the idle detector 430 controls the multiplexer 405 to switch the input of the symbol buffer 410 from the modulator 320 to the idle symbol buffer 400. Thus, during the time when no user data is available (i.e., idle), the predetermined idle waveform is supplied by the idle symbol buffer 400 to fill the idle time. While the idle symbol buffer 400 is providing data to the symbol buffer 410, the modulator 320 is not required to perform any modulation functions. This provides a significant processing resource and power dissipation advantage in that cycles are not used for modulating idle data.

Figure 5:
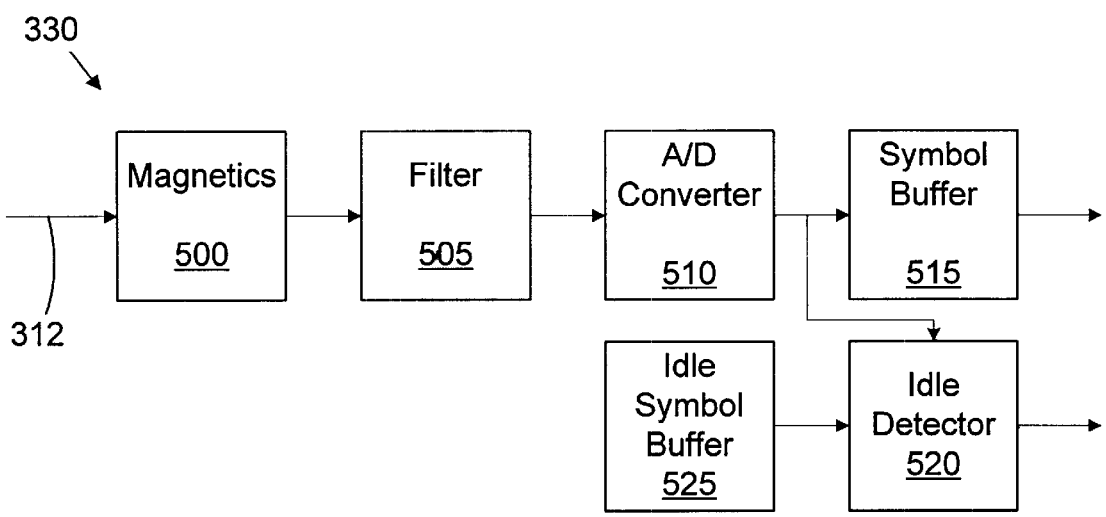
FIG. 5 illustrates a simplified block diagram of a receiver analog front end of the modem of FIG. 3.

Referring to FIG. 5, a simplified block diagram of the receive analog front end 330 is provided. The receive analog front end 330 includes a magnetics block 500 for interfacing with the communications channel 312, and a filter 505. The filter 505 is typically an antialias filter adapted to restrict the bandwidth of the signal in preparation for the upcoming digital sampling. An analog-to-digital (A/D) converter 510 provides digital samples of the received waveform, which are stored in a symbol buffer 515. The received waveform samples from the symbol buffer 515 are provided to the demodulator 335 (shown in FIG. 3) for processing.

An idle detector 520 monitors the output of the A/D converter 510 to determine if the received waveform samples correspond to an idle waveform. An idle symbol buffer 525 stores data related to the construct of the idle waveform for use by the idle detector 520. In response to the detection of an idle condition, the idle detector 520 provides an idle detection signal to the control logic 345 (shown in FIG. 3). The control logic 345, in response to the idle detect signal, discards the idle waveform data and bypasses the demodulator 335 (shown in FIG. 3). Thus, processing resources and power are not unnecessarily dissipated by the demodulator 335 to process idle data.

For exemplary purposes, several methods for determining the makeup of the idle waveform for storing in the idle symbol buffers 400, 525 of the transmitter 305 and the receiver 310, respectively, are described. These methods are illustrative in nature, and it is contemplated that idle symbol waveforms may be generated using other techniques depending on factors such as the specific modem protocol being implemented.

A first technique for generating an idle symbol waveform is to predefine a certain waveform as an idle waveform per the modem protocol. For example, in the context of an ADSL modem, a waveform including only pilot tones may represent an idle condition.

Alternatively, a synchronization symbol (defined by the protocol) may be used. If a predefined, stationary signal is selected as the idle waveform, the idle detector 520 associated with the receiver 310 may be a simple tone detector or energy detector.

One possible limitation of using a predefined or stationary signal, is that the idle signals on proximate twisted pairs within a communications cable may become correlated and cause undesirable noise or cross-talk that interferes with other pairs in the cable. To avoid this limitation, an idle waveform might include some stationary and some random or changing components. For example, rather than defining a single symbol that is repeated every cycle, a set of five symbols may be chained to define the idle waveform. Thus, the likelihood of adjacent pairs being at the same point in the idle waveform is reduced and the propensity for interference is likewise decreased.

Another technique for generating an idle waveform is to pre-compute the idle waveform once the parameters for communicating over the communication channel 312 have been determined. During the training process, factors, such as the number of tones, bits per tone, gain on each tone, etc. are determined per the particular protocol being implemented. Based on this characteristic information, the output of the modulator 320 during an idle condition may be simulated and used to load the idle symbol buffers 400, 525.

Still another technique involves defining an interval during the training period where idle data is exchanged. The idle data is modulated and communicated to the interfacing modem (not shown). The output of the modulator 320 may be captured during this idle interval to populate the idle symbol buffer 400 of the associated transmitter 305. Likewise, the input to the demodulator 335 may be captured during the idle interval to populate the idle symbol buffer 525 associated with the receiver 310.

Regardless of how the idle waveform is generated, the modem 100 may exchange its idle waveform data with the interfacing modem (not shown) after populating one or both of the idle symbol buffers 400, 525. For example, the idle waveform associated with the transmitter 305 of the modem 300 corresponds to the idle waveform associated with the receiver (not shown) of the interfacing modem (not shown). Likewise, the idle waveform associated with the receiver 310 of the modem 300 corresponds to the idle waveform associated with the transmitter (not shown) of the interfacing modem (not shown). By sharing the idle waveform data, the determination need not be repeated on both sides of the communications channel 312.

During normal data transmission, synchronization symbols are interleaved with the data symbols so that the interfacing modem (not shown) may remain in synch with the modem 100. In the case where idle symbols are sent by the modem 100 in response to the absence of user data, the idle symbols may also be interleaved with synchronization symbols to achieve a similar effect. Techniques for generating synchronization symbols are known to those of ordinary skill in the art.

Figure 6:
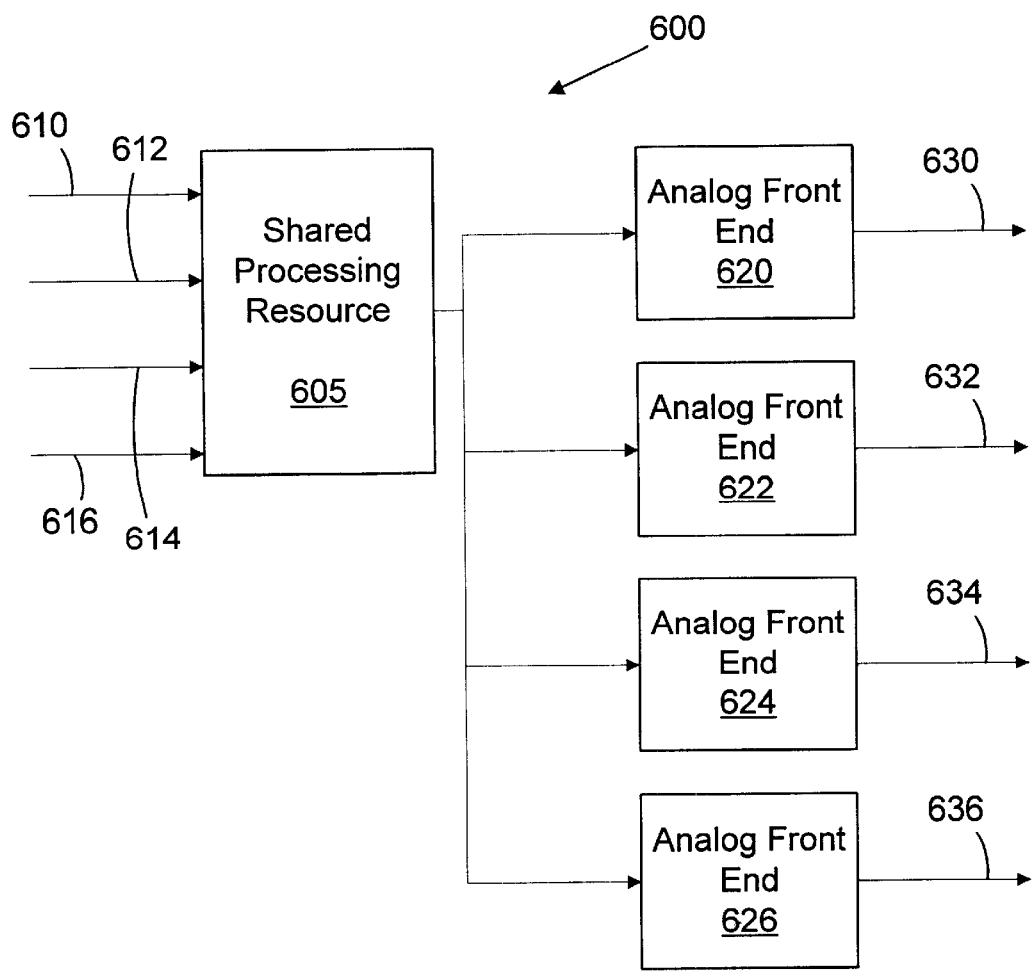
FIG. 6 is a simplified block diagram of a communication system in accordance with the present invention using pooled processing resources.

Generating and detecting idle conditions without requiring processing by the modulator 320 or demodulator 335 provides significant advantages in terms of processing and electrical power resource savings. This advantage is especially useful in a pooled environment, where multiple communications channels 312 are supported by common processing resources. FIG. 6 illustrates a simplified block diagram of a communications system 600 in accordance with the present invention using pooled processing resources. The communications system 600 includes a shared processing resource 605 receiving data from multiple users on lines 610, 612, 614, 616. A plurality of analog front ends 620, 622, 624, 626 are coupled to the shared processing resource 605, each being associated with one of the user lines 610, 612, 614, 616. Each of the analog front ends 620, 622, 624, 626 includes circuitry similar to the transmit and receive analog front ends 325, 340 of FIGS. 4 and 5. Each of the analog front ends 620, 622, 624, 626 services a communications channel 630, 632, 634, 636 (i.e., phone line) or use by a particular user.

Detecting and responding to idle conditions in the analog front ends 620, 622, 624, 626 reduces the processing burden of the shared processing resource 605. Cycles saved by not having to modulate and demodulate idle data can be applied to one of the users currently generating user data, thus increasing the efficiency of the shared processing resource 605. This increase in efficiency may result in lower costs for the shared processing resource 605 or an increase in the number of users that can be supported. Also, the idle components use less electrical power and generate less heat.

Figure 7:
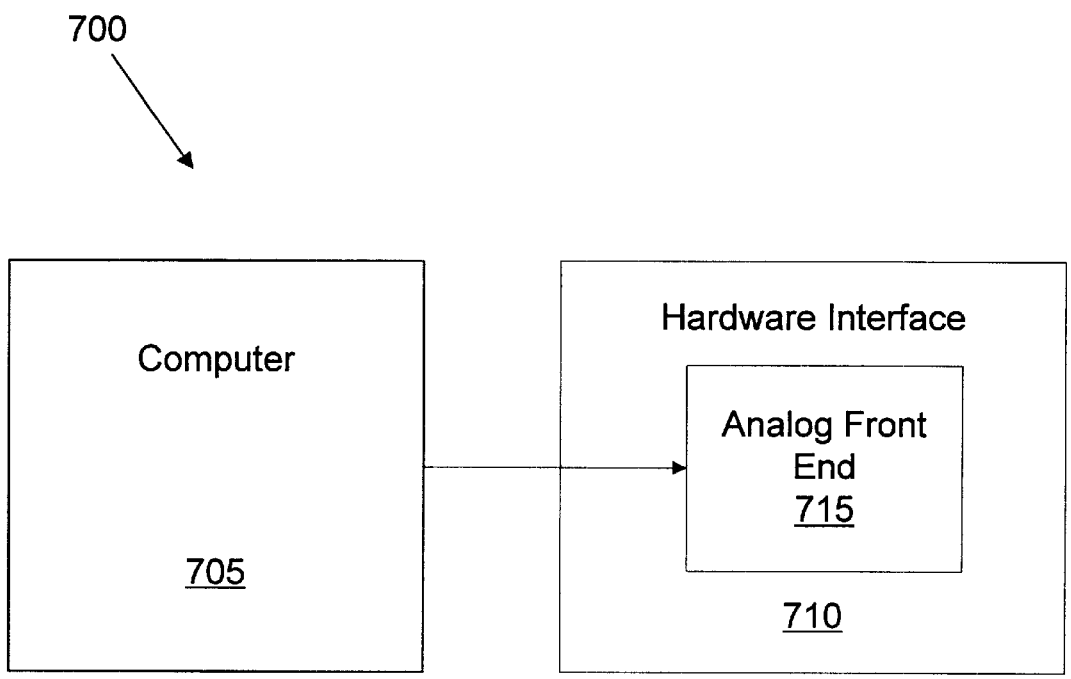
FIG. 7 illustrates a software modem communications system in accordance with the present invention.

FIG. 7 illustrates the present invention implemented using a software modem communications system 700. The software modem communications system 700 includes a computer 705 for executing modem software and a hardware interface 710. The hardware interface 710 includes an analog front end 715 functioning similar to the transmit and receive analog front ends 325, 340 of FIGS. 4 and 5. Because idle condition detection and response is conducted by the analog front end 715, the modulation and demodulation functions may be performed by the computer 705.

At times, an operating system of the computer 705 may not have available processing resources for servicing the modem software due to other resource demands or conflicts. If the modem software stops sending user data during such a time, the analog front end 715 will fill the idle time with idle symbols until the computer 705 is once again able to service the modem software. If nothing is sent by the software modem communications system 700 during the time the computer 705 is unavailable, the connection might be lost or data corrupted. Because the idle symbols are generated independent of the computer 705 and its availability, the connection is more reliable and robust.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A communications system, comprising:

a communications channel;

first and second modems configured to communicate over the communications channel, the first modem comprising:
  a transmitter adapted to transmit digital data, the digital data including user data, the transmitter including;
    a first idle symbol buffer adapted to store an idle symbol, the idle symbol being captured during a training period during which the first and second modems exchanged idle data; and
    a first idle detector adapted to detect an absence of user data, wherein the transmitter is adapted to transmit the first idle symbol in response to detecting the absence of user data.

2. The communication system of claim 1, wherein the transmitter further includes:

a buffer adapted to store the user data;

a modulator adapted to receive the user data and generate a user symbol based on the user data;

a digital-to-analog converter adapted to receive an input symbol and generate a transmit waveform based on the input symbol; and logic adapted to provide the first idle symbol as the input symbol to the digital-to-analog converter in response to an absence of user data and provide the user symbol as the input symbol to the digital-to-analog converter in response to a presence of user data in the buffer.

3. The communication system of claim 1, wherein the idle symbol includes at least one non-stationary component.

4. The communication system of claim 2, wherein the idle symbol is based on a transmission parameter of the modulator.

5. The communication system of claim 4, wherein the modulator is adapted to modulate the user data using a plurality of tones, and the transmission parameter includes a number of bits assigned to at least one of the tones.

6. The communication system of claim 4, wherein the modulator is adapted to modulate the user data using a plurality of tones, and the transmission parameter includes a gain factor applied to at least one of the tones.

7. The communication device of claim 1, wherein the transmitter is adapted to transmit a plurality of idle symbols and to interleave synchronization symbols within the plurality of idle symbols.

8. The communications system of claim 1, wherein the idle symbol comprises a first idle symbol, and the first modem further comprises:
  a receiver, comprising:
    an analog-to-digital converter adapted to sample the analog waveform to generate a receive symbol;
    a demodulator adapted to receive the receive symbol and generate received data based on the receive symbol;
    a second idle buffer adapted to store a second idle symbol; and
    an idle detector adapted to compare the second idle symbol to the receive symbol to detect an idle condition and to bypass the demodulator in response to the idle condition.

9. The communications system of claim 8, wherein the second idle symbol is based on a receive parameter of the demodulator.

10. The communications system of claim 9, wherein the demodulator is adapted to demodulate the user data based on a plurality of tones, and the receive parameter includes a number of bits assigned to at least one of the tones.

11. The communication system of claim 9, wherein the demodulator is adapted to demodulate user data based on a plurality of tones, and the receive parameter includes a gain factor applied to at least one of the tones.

12. The transceiver of claim 10, wherein the second idle buffer comprises the first idle buffer.

13. The communications system of claim 1, the second modem comprising:
  a receiver adapted to receive an analog waveform from the first modem over the communications channel, the receiver comprising:
    an analog-to-digital converter adapted to sample the analog waveform to generate a receive symbol;
    a demodulator adapted to receive the receive symbol and generate received data based on the receive symbol;
    a second idle buffer adapted to store the idle symbol captured during the training period; and
    a second idle detector adapted to compare the idle symbol to the receive symbol to detect an idle condition and to bypass the demodulator in response to the idle condition.

* * * * *